Oct. 4, 1932.  A. S. CAMPBELL  1,880,783
VEHICLE DOOR
Filed Sept. 22, 1928

Inventor:
Alphonso S. Campbell,
by Emery, Booth, Janney & Varney
Attys.

Patented Oct. 4, 1932

1,880,783

UNITED STATES PATENT OFFICE

ALPHONSO S. CAMPBELL, OF WINCHESTER, MASSACHUSETTS, ASSIGNOR TO A. S. CAMPBELL COMPANY, OF EAST BOSTON, MASSACHUSETTS, A CORPORATION OF MASSACHUSETTS

VEHICLE DOOR

Application filed September 22, 1928. Serial No. 307,594.

This invention relates to the construction of doors for automobile bodies of the closed type and the object is to provide an improved construction of metallic door pillar and one, moreover, particularly applicable to jobs wherein the forward corner assembly of the door structure, comprising the door pillar, body pillar and windshield frame, if present, is of small dimension.

Figure 1:
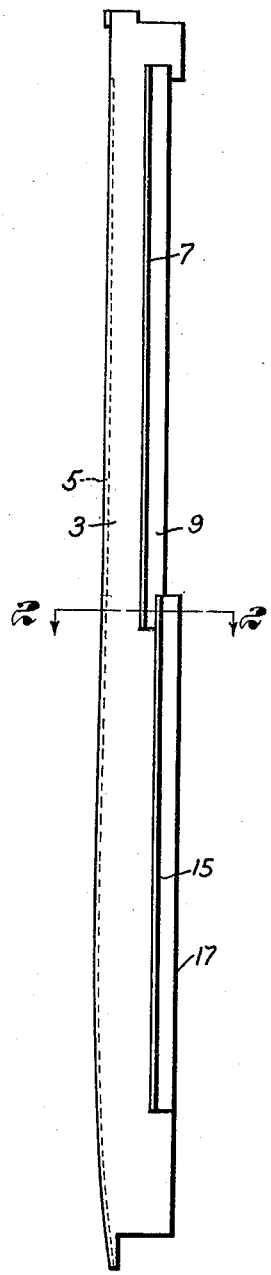
Figure 2:
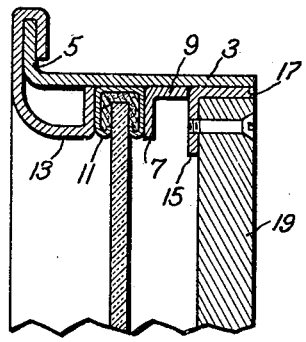

My invention will be well understood by reference to the following description of the illustrative embodiment thereof shown in the accompanying drawing wherein:

Fig. 1 is an elevation of the door pillar detached as seen from the inner side; and Fig. 2 is a section through the edge of the complete door on the plane of the line 2—2 of Fig. 1.

In the following description the words "exterior" and "interior" are used with reference to the vehicle as a whole, and the words "inner" and "outer" with respect to the door structure independently of its position in the vehicle.

The door pillar shown in Fig. 1 may conveniently be the hinge pillar of the complete door, and may be combined with a cooperating lock pillar, header bar and bottom board which may be of widely varying constructions. It is therefore deemed unnecessary to illustrate the rest of the door in detail. The main body of the pillar is preferably formed of a single thickness of sheet metal having a web-like body 3 adapted to lie against the jamb of the door opening. This web may be provided on the exterior side with an outwardly presented flange 5 constituting a door overlap. The features of construction so far described are not novel to the present application. The depth of the web 3 from exterior to interior may be substantially less at the upper portion corresponding to the windowed section of the door above the belt line than in the lower portion which lies below the belt line as is clearly illustrated in Fig. 1.

The upper portion of the web 3 may be strengthened by a flange 7 extending inwardly, that is, away from the cooperating jamb, from the inner face of the web at a location spaced from the interior edge thereof, and herein this flange 7 is shown as one flange of an angle, the other flange 9 of which lies flatwise against the inner face of the web 3 and may terminate flush with the interior edge thereof. This arrangement provides a T section for this portion of the web adapted to give it particular rigidity. The flange 7 may define the interior wall of a glass run channel and herein, see Fig. 2, I show a glass run 11 as installed between the same and a cooperating exterior molding 13 formed as a part of the outer panel of the door, the edge of which is clinched around the overlap flange 5.

The lower portion of the pillar may be strengthened somewhat similarly by a flange 15 projecting from the inner face thereof exteriorly of the interior edge thereof, and this is herein shown as likewise formed as one flange of an angle, the other flange 17 of which may terminate flush with the interior edge of this part of the web 3. Again a T section is provided highly resistant against bending. As seen in Fig. 2, the lock board or regulator board 19 may be received against the interior face of the flange 15 and supported thereby. The flanges 7 and 15 extend past each other adjacent the belt line, as clearly shown in Fig. 1, the flange 9 herein being somewhat cut away at its lower portion to receive the upper portion of the angle formed by the parts 15 and 17. The pillar is thus doubly reinforced at the location of the belt and where the window opening begins as against strains applied in a direction perpendicular to the plane of the paper shown in Fig. 1 and there is no weak spot in the pillar from top to bottom as against the strains in the plane of the paper, this being due to the overlapping or extension of the flanges 7 and 15, one past the other.

By this construction a door pillar comprising primarily a sheet metal body of web-like section is provided for and one having particular rigidity without undue weight, excessive dimension or complication of construction.

In the appended claims I have attempted to use the words "interior" and "exterior" with reference to the body in which the door is mounted, and the words "inner" and "outer" with reference to the door as an independent structure.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A metal door pillar for the door of a closed vehicle comprising a main web-like body to lie adjacent the jamb of the door and a reinforcing angle iron having a flange secured directly to the inner face of said body with its extremity substantially flush with the interior boundary thereof, its other flange extending inwardly from the angle and defining a wall of a glass run.

2. A metal door pillar for the door of a closed vehicle comprising a main web-like body to lie adjacent the jamb of the door, a reinforcing angle iron having a flange secured directly to the inner face of said body and extending interiorly from the angle, its other flange extending inwardly from the angle and defining a wall of a glass run, and a similarly disposed angle having a flange secured to the inner face of said body and an inwardly projecting flange for supporting a lock board, the inwardly projecting flanges extending past one another in the vicinity of the belt.

3. A metal door pillar for the door of a closed vehicle comprising a main web-like body to lie adjacent the jamb of the door, a reinforcing angle iron having a flange secured directly to the inner face of said body and extending interiorly from the angle, its other flange extending inwardly from the angle and defining a wall of a glass run, and a similarly disposed angle having a flange secured to the inner face of said body and an inwardly projecting flange for supporting a lock board, the inwardly projecting flanges extending past one another in the vicinity of the belt and the interiorly projecting flanges terminating flush with the interior edge of said body.

4. A metal door pillar for the door of a closed vehicle comprising a main web-like body to lie adjacent the jamb of the door and a reinforcing angle iron having a flange directly secured to the inner face of the body and a flange inwardly projecting to provide a wall of a glass run, and a second angle iron having a flange directly secured to the inner face of the body in the same plane as the corresponding flange of the other angle and an inwardly projecting flange for supporting a lock board, said angles extending past one another in the vicinity of the belt.

In testimony whereof, I have signed my name to this specification.

ALPHONSO S. CAMPBELL.